(12) United States Patent
Pike, Sr.

(10) Patent No.: US 11,795,105 B2
(45) Date of Patent: Oct. 24, 2023

(54) MIXED LANDFILL AND POND COAL COMBUSTION BYPRODUCTS (CCBS) AND RELATED TECHNIQUES

(71) Applicant: VHSC, LTD., Tortola (VG)

(72) Inventor: Clinton W. Pike, Sr., Montgomery, TX (US)

(73) Assignee: VHSC, LTD., Tortola (VG)

( * ) Notice: Subject to any disclaimer, the term of this patent is extended or adjusted under 35 U.S.C. 154(b) by 258 days.

(21) Appl. No.: 17/218,693

(22) Filed: Mar. 31, 2021

(65) Prior Publication Data

US 2022/0024819 A1 Jan. 27, 2022

Related U.S. Application Data

(60) Provisional application No. 63/054,264, filed on Jul. 21, 2020.

(51) Int. Cl.
| | | |
|---|---|---|
| *C04B 18/10* | (2006.01) | |
| *C04B 18/06* | (2006.01) | |
| *C04B 18/08* | (2006.01) | |
| *C04B 28/14* | (2006.01) | |
| *B09B 3/25* | (2022.01) | |
| *C04B 111/00* | (2006.01) | |
| *B09B 101/30* | (2022.01) | |

(52) U.S. Cl.
CPC .............. *C04B 18/10* (2013.01); *B09B 3/25* (2022.01); *C04B 18/065* (2013.01); *C04B 18/08* (2013.01); *C04B 28/14* (2013.01); *B09B 2101/30* (2022.01); *C04B 2111/00767* (2013.01)

(58) Field of Classification Search
CPC ....... C04B 18/10; C04B 18/065; C04B 18/08; C04B 18/30; C04B 28/02; C04B 28/14; C04B 2111/00767; C04B 2111/00017; B09B 3/25; B09B 3/40; B09B 2101/30; Y02W 30/91
See application file for complete search history.

(56) References Cited

U.S. PATENT DOCUMENTS

| | | | |
|---|---|---|---|
| 2,021,623 A | 11/1935 | Breerwood | |
| 2,564,690 A | 8/1951 | Havelin et al. | |
| 3,565,648 A | 2/1971 | Mori et al. | |
| 3,852,084 A | 12/1974 | Webster et al. | |
| 3,961,973 A | 6/1976 | Jones | |
| 4,018,619 A | 4/1977 | Webster et al. | |
| 4,054,463 A | 10/1977 | Lin | |
| 4,482,096 A | 11/1984 | Lin | |
| 4,679,736 A | 7/1987 | Orlando | |
| 4,887,773 A | 12/1989 | Mehltretter | |
| 5,511,495 A | 4/1996 | Kinto et al. | |
| 5,714,002 A | 2/1998 | Styron | |
| 5,988,396 A | 11/1999 | Minkara et al. | |
| 6,030,446 A * | 2/2000 | Doty | C04B 28/04 106/819 |
| 6,634,576 B2 | 10/2003 | Verhoff et al. | |
| 6,637,354 B2 | 10/2003 | Ramme | |
| 6,730,161 B2 | 5/2004 | Lakshmanan et al. | |
| 6,802,898 B1 | 10/2004 | Liskowitz et al. | |
| 6,890,507 B2 | 5/2005 | Chen et al. | |
| 6,936,098 B2 | 8/2005 | Ronin | |
| 7,240,867 B2 | 7/2007 | Ronin | |
| 7,323,021 B2 | 1/2008 | Trass et al. | |
| 7,669,790 B2 | 3/2010 | Ronin et al. | |
| 7,931,220 B2 | 4/2011 | Grasso, Jr. et al. | |
| 8,051,985 B2 | 11/2011 | Matsuo et al. | |
| 8,254,490 B2 | 8/2012 | Chandra | |
| 8,967,506 B2 | 3/2015 | Pike, Sr. | |
| 9,254,490 B2 | 2/2016 | Pike, Sr. | |
| 9,676,668 B2 | 6/2017 | Pike et al. | |
| 10,308,552 B2 | 6/2019 | Dubey et al. | |
| 2003/0066461 A1 | 4/2003 | Chen et al. | |
| 2004/0247846 A1 | 12/2004 | Uzawa et al. | |
| 2005/0005823 A1 | 1/2005 | Gourley et al. | |
| 2006/0201395 A1 | 9/2006 | Barger et al. | |
| 2007/0034118 A1 | 2/2007 | Jardine et al. | |
| 2008/0308659 A1 | 12/2008 | Grasso, Jr. et al. | |
| 2009/0121052 A1 | 5/2009 | Ronin et al. | |

(Continued)

FOREIGN PATENT DOCUMENTS

| | | |
|---|---|---|
| CN | 1974465 A | 6/2007 |
| CN | 100412020 C | 8/2008 |

(Continued)

OTHER PUBLICATIONS

Mangi et al., "Performances of concrete containing coal bottom ash with different fineness as a supplementary cementitious material exposed to sweater", Science Direct, Engineering Science and Technology, an International Journal, vol. 22, Issue 3, Jun. 2019, pp. 929-938, 31 pages.

(Continued)

*Primary Examiner* — Anthony J Green

(74) *Attorney, Agent, or Firm* — Hayes Soloway PC

(57) ABSTRACT

Methods and systems for reclaiming materials from a mixed waste landfill containing coal combustion byproducts (CCBs) are disclosed. The methods and systems can be used to reclaim CCBs from ponds or dry landfills by obtaining mixed waste, crushing the mixed waste to form crushed mixed waste, drying the crushed mixed waste to form dried crushed mixed waste, and combining the dried crushed mixed waste with other compounds to form a blend. The blends can then be incorporated into a cement material, which may be used to form concrete.

15 Claims, 1 Drawing Sheet

(56) References Cited

U.S. PATENT DOCUMENTS

| | | |
|---|---|---|
| 2009/0188998 A1 | 7/2009 | Anderson et al. |
| 2012/0280069 A1 | 11/2012 | Pike, Sr. |
| 2015/0175887 A1 | 6/2015 | Welker |
| 2021/0061709 A1 | 3/2021 | Pike, Sr. |

FOREIGN PATENT DOCUMENTS

| | | | | |
|---|---|---|---|---|
| CN | 103056001 A | | 4/2013 | |
| CN | 103113088 A | | 5/2013 | |
| DE | 102005045803 A1 | | 4/2007 | |
| EP | 1688182 A1 | | 8/2006 | |
| KR | 10-2005-0074538 A | * | 7/2005 | |
| MX | 2013006621 A | * | 12/2014 | ............ C04B 18/22 |
| RU | 2388710 C1 | | 5/2010 | |
| WO | 2009064244 A1 | | 5/2009 | |
| WO | WO-2013093538 A1 | * | 6/2013 | ............ C04B 18/30 |
| WO | 2014004943 A1 | | 1/2014 | |
| WO | WO-2014188034 A1 | * | 11/2014 | ........... C04B 18/165 |

OTHER PUBLICATIONS

Sasaki, "Effect of grinding on the rate of oxidation of pyrite by oxygen in acid solutions", Science Direct. Geochimica et Cosmochimica Acta, vol. 58, Issue 21, Nov. 1994, pp. 4649-4655, 2 pages.

Kosmatka et al., "Design and Control of Concrete Mixtures", Engineering Bulletin 001, Fourteenth Edition, Portland Cement Association PCA, 2003, pp. 1-54, 56 pages.

Bouzoubaa et al., "The Effect of Grinding on the Physical Properties of Fly Ashes and a Portland Cement Clinker", Peragom, Elsevier Science Ltd., Cement and Concrete Research, vol. 27, Issue No. 12, 1997, pp. 1861-1874, 14 pages.

Bouzoubaa et al., "Mechanical Properties and Durability of Concrete Made with High-Volume Fly Ash Blended Cements Using a Coarse Fly Ash", Cement and Concrete Research, vol. 31, 2001, pp. 1393-1402, 10 pages.

* cited by examiner

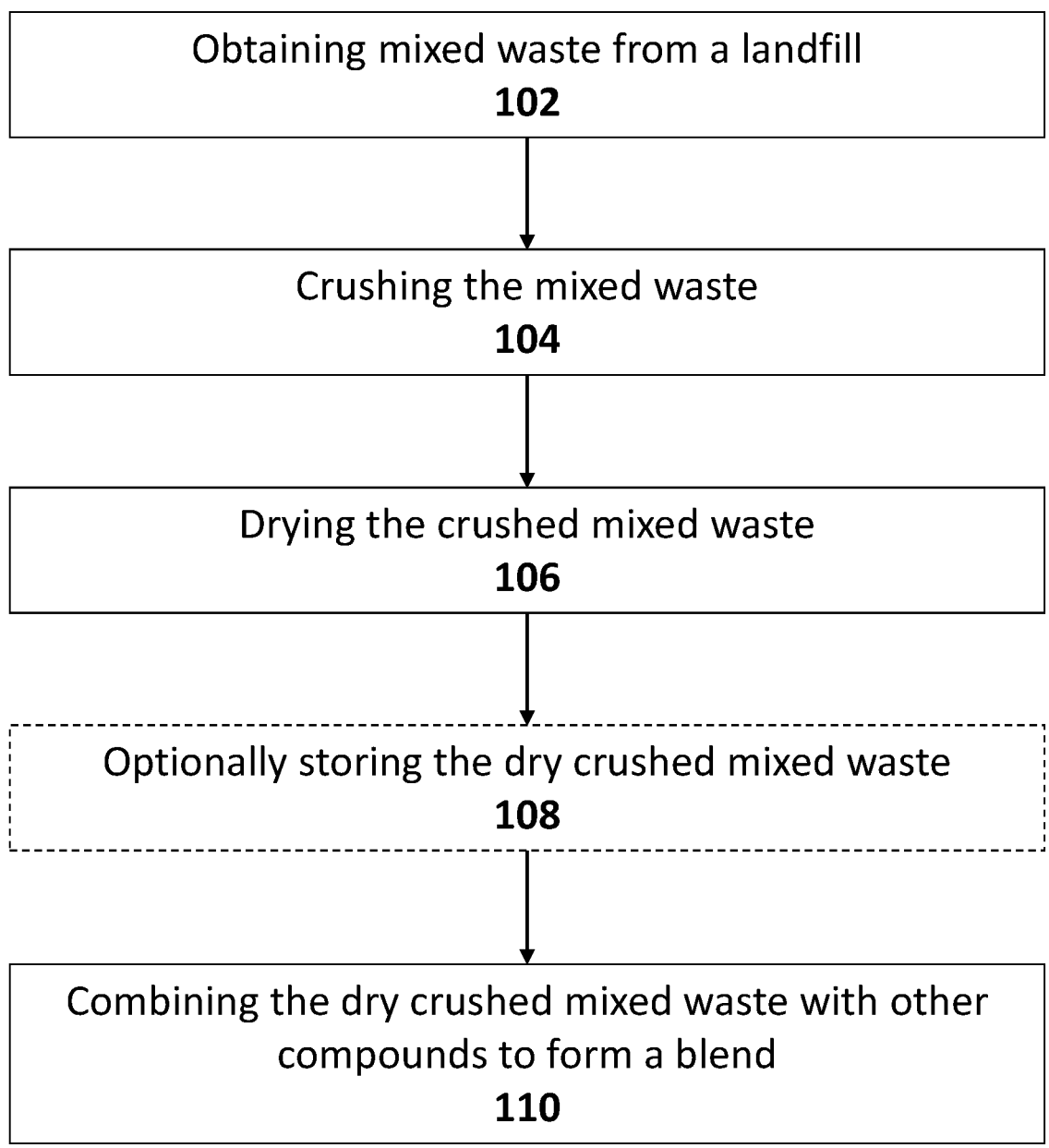

MIXED LANDFILL AND POND COAL COMBUSTION BYPRODUCTS (CCBS) AND RELATED TECHNIQUES

CROSS-REFERENCE TO RELATED APPLICATIONS

This application claims the benefit of U.S. Provisional Patent Application No. 63/054,264, filed Jul. 21, 2020, the contents of which are hereby incorporated by reference.

FIELD OF THE DISCLOSURE

The present disclosure relates to methods of producing additives for cementitious materials and, more particularly, to methods of reclaiming coal combustion byproducts (CCBs) from mixed materials deposited in landfills and ponds.

BACKGROUND

Since the early 1950s, coal-fired power plants have been the largest supplier of electricity in the United States. These coal-based power plants, which at one time numbered over 450, vary in size from the oldest units (circa 1950s) producing around 50 MW per unit to the latest units (circa 1990s) producing around 800-900 MW per unit.

The coal of choice usually has been the most economical coal to mine and move to a given power station. In the western U.S. (e.g., Texas), there are lignite coal fields where power station plants literally were built in the middle of the reserves. In the eastern U.S. (e.g., Georgia), transloading facilities were built to offload barges of coal transported by river, then loaded on rail to be delivered to power station sites. In all of these locations, the economics of getting coal to the power station were prime factors in deciding the location of the power plants, as well as where the power station tied into the power grid. At each of these sites, the coal combustion byproducts (e.g., fly ash, bottom ash, and scrubber residue) required large areas dedicated to their disposal. Numerous different techniques were used to dispose of such large volumes of coal combustion byproducts, and many were stored in landfills or ponds. In particular, many coal power plants in the eastern United Stated were sluiced with water to ponds, and the water was recycled. In the western United States, these wastes were often conditioned with water and disposed of in a landfill.

In many cases, these materials were comingled together for disposal to lower costs. In the early 1970s, a large push was made to start utilizing fly ash as a supplementary cementitious material (SCM) in concrete. The bottom ash material also found some use as a lightweight aggregate. However, the majority of each was still disposed of in either ponds or landfills.

SUMMARY

The present disclosure relates to methods and techniques for retrieving and processing useful products from co-mingled waste landfills and ponds used to dispose of coal combustion byproducts (CCBs).

Previously, it has been difficult to recover useful products, such as fly ash and bottom ash, from co-mingled waste disposal sites. While recovering these useful products from single-component waste disposal sites has proven relatively easy, recovering usable single-component products from co-mingled waste has not previously been feasible for both practical and economic reasons.

Mixed-waste landfills (e.g., landfills containing all the fired coal residues and/or gas scrubbing residues) are extremely difficult to reclaim successfully for use in concrete. In addition to all the coal combustion byproducts (CCB), mixed-waste landfills often include types of wastes the utility would also dispose of, such as raw coal and pyrites rejected from the coal pulverizers used at the coal-fired power stations, as well as certain other wastes associated with improper maintenance of coal pulverizers (e.g., raw coal disposed of with bottom ash). These mixed-waste landfills can therefore vary greatly with respect to the types and quantities of minerals present.

Another issue presented by reclaiming products from mixed-waste sites is simply removing these wastes and then drying them to screen out the fly ash. However, basic size-based separation techniques are not suitable to isolate fly ash from mixed waste because the size of fly ash (approximately 45 µm) is functionally equivalent to the size of the scrubber waste that may be present. A mixture of both fly ash and scrubber waste would not be suitable for use in concrete, making separation quite important. Additionally, raw coal and pyrites can run from almost no trace (0 wt %) to sometimes 40-50 wt % or higher of the landfill mix. In fact, samples taken from a particular power station showed this high variability, depending on where the waste was recovered from within the landfill.

All of this contamination and no easy way to separate the contaminants from the fly ash or bottom ash creates difficulties for using these landfill materials in concrete. Additionally, bottom ash has some reactivity depending on its chemistry and surface area, especially once it is ground-down with additives. Simply reclaiming the materials to make a "clean fly ash" is therefore not practical. Also, for most landfills, the bottom ash is the largest mineral component in the landfill; it is not practical to dry and sift out the bottom ash alone.

The present disclosure describes methods and systems for reclaiming additives for cement from a mixed waste landfill. In some embodiments, the disclosed methods include obtaining mixed waste from a landfill, crushing the mixed waste to form crushed mixed waste, drying the crushed mixed waste to form dried crushed mixed waste, and combining the dried crushed mixed waste with other compounds to form a blend. In some embodiments, the mixed waste includes coal combustion byproducts (CCBs) from a coal-fired power plant. In these and other embodiments, the landfill is a pond or a dry landfill. The mixed waste may, in some cases, contain fly ash, bottom ash, scrubber residue, pyrites, and/or coal. In some such embodiments, the mixed waste may have a moisture content of between 10% and 20%. In select embodiments, the mixed waste is crushed to a size of 50-325 mesh. The crushed mixed waste may be dried at a temperature of at least 350° F. In these and other embodiments, the crushed mixed waste may be dried until a moisture content of less than 2% is achieved. The disclosed methods may, in some cases, also include exposing the crushed mixed waste to a desorber to capture compounds that are volatized during drying. In these and other embodiments, the disclosed methods may include storing the dried crushed mixed waste in a silo. In select embodiments, the dried crushed mixed waste may be combined with class C fly ash, a high-activity natural pozzolan, class F fly ash, and/or dried class C bottom ash ground to a mean particle size of 15-20 µm to form the blend. In some such embodiments, the methods may also include adding calcium sulfate to form the blend. If desired, the blend may be incorporated into a cement material.

In addition to the presently disclosed methods, the subject disclosure is also directed to concretes produced according to the disclosed methods as well as concrete products containing concrete produced as described herein.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 1 illustrates an exemplary method of reclaiming additives for cement from a CCB mixed waste landfill or coal-fired power station ash ponds, in accordance with some embodiments of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

The present disclosure addresses issues relating to mining deposits of mixed coal combustion byproducts (fly ash), flue gas scrubber residue (FGD), bottom ash (DBFS), pyrites from coal crushing (mill rejects), and other co-mingled wastes. Moreover, the present disclosure includes sufficient processing techniques to make a consistent Grade 100 or 120 reactive pozzolan, which can be used as a 50% replacement of OPC material in cement and concrete making.

FIG. 1 illustrates an example method 100 of reclaiming additives for cement from CCB mixed waste landfills or coal-fired power station ash ponds, in accordance with embodiments of the present disclosure. As discussed in detail below, method 100 advantageously allows the materials present in these landfills or ponds to be reclaimed and used at a reactivity level much higher than just ASTM C 618 fly ash.

As shown in FIG. 1, method 100 includes obtaining mixed waste from a landfill (Block 102). In some embodiments, the mixed waste may obtained from a coal-fired power plant. The mixed waste may be obtained from a wet or dry landfill. For example, in some embodiments, the mixed waste is obtained from a pond or a dry landfill. In these and other embodiments, the mixed waste may contain fly ash, bottom ash, scrubber residue, pyrites, and/or coal. The mixed waste may, in some embodiments, have a moisture content of between 5% and 30%, such as between 10% and 20%, or approximately 12%, in some embodiments.

Table 1 shown below identifies the contents of a particular example mixed waste site located in Texas. At this landfill, which is a coal fired power plant/mixed waste landfill, five core samples were obtained. The moisture content of each core was between 9%-18%, with an average of approximately 12% moisture. The contents of the core samples were analyzed to determine the compounds present and the detected compounds are listed below in Table 1.

TABLE 1

| Measured Contents of Core Landfill Samples | | | | | | | | | | | |
|---|---|---|---|---|---|---|---|---|---|---|---|
| Compound | Mg | $Al_2O_3$ | $SiO_2$ | $SO_3$ | $K_2O$ | CaO | $Fe_2O_3$ | $Na_2O$ | LOI | Total | Sum |
| Avg (%) | 2.25 | 14.48 | 46.35 | 11.55 | 0.91 | 15.92 | 6.96 | 0.20 | 0.50 | 98.61 | 67.79 |

Based on the analysis performed on the core samples, fly ash, bottom ash, scrubber, pyrites, and coal were believed to be present in the mixed waste landfill. It should be understood that the contents of this sample landfill can be processed according to method 100 shown in FIG. 1.

Method 100 continues with crushing the obtained mixed waste (Block 104). If desired, two large roll-crushers may be used to crush the obtained mixed waste. Depending on the site location, remote crushers can be used and the resultant crushed materials can then be moved to a separate location. The mixed waste can be crushed to any desired size. For example, in some embodiments, the mixed waste can be crushed to a size of between 50 and 325 mesh.

Method 100 continues with drying the crushed mixed waste (Block 106). Any suitable type of dryer may be used to dry the crushed mixed waste. For example, in some embodiments, the crushed mixed waste may be passively dried by ambient temperature whereas, in other embodiments, the crushed mixed waste may be dried by a commercial drying system, such as a Holo-Flite® dryer (HFD) (available from Metso, Joy Denver, or BCR Environmental Therma-Flite). If a commercial drying system is used, the crushed mixed waste may be dried at a temperature of at least 200° F., 250° F., 300° F., 350° F., or 400° F., in some embodiments. In these and other embodiments, the drying system may be set to a temperature at or below 400° F. Using a temperature of approximately 400° F. or less may allow the majority of the sulfite present to remain as sulfite and not be converted to gypsum, which can be preferable for the final product to avoid negative impacts on the resulting concrete. In some embodiments, the crushed mixed waste may be dried until a moisture content of less than 10%, less than 8%, less than 5%, less than 2%, or less than 1% is achieved.

In select embodiments, a desorber system attachment may be used on the drying system to capture the heat given off from coal or other fuel that travels through the dryer. If present, a desorber system attachment can capture compounds that are volatized at or below 400° F. (i.e., the operating temperature of the HFD), thereby helping to reduce the demand on natural gas firing, which is commonly used to fire the HFD. As will be appreciated, using a desorber system attachment may allow the user to capture additional heat generated by the drying system to aid in drying the crushed mixed waste.

Method 100 continues with optionally storing the dried and crushed mixed waste (Block 108). If storing is desired, a silo or other structure may be used to store the dried and crushed mixed waste in a stable and dry environment.

Method 100 continues with combining the dried and crushed mixed waste with other components to form a blend (Block 110). In some embodiments, the dried and crushed mixed waste may be combined with class C fly ash, high-activity natural pozzolan (e.g., MicraSil® manufactured by Imerys), class F fly ash, and/or dried class C bottom ash ground to a mean particle size of 15-20 μm. For clarity, the chemistry of typical class C bottom ash is as shown in below in Table 2.

TABLE 2

Composition of Typical Class C Bottom Ash

| | Mg | $Al_2O_3$ | $SiO_2$ | $SO_3$ | $K_2O$ | CaO | $Fe_2O_3$ | Total | Sum |
|---|---|---|---|---|---|---|---|---|---|
| LMS C BA (%) | 3.61 | 24.72 | 31.22 | 1.11 | 0.31 | 16.49 | 5.73 | 83.19 | 61.67 |

In some embodiments, either class F fly ash or high-activity natural pozzolan may be used to form the blend with the dried and crushed mixed waste, class C fly ash, and/or dried class C bottom ash ground to a mean particle size of 15-20 μm. Depending on the blending technique used, each of the components added to the blend may be stored in neighboring silos to facilitate processing.

In select embodiments, calcium sulfate may also be incorporated into the blend. Incorporating calcium sulfate may be desirable in situations where calcium sulfite in the mixed waste is lower than preferred. Any suitable ratios of components may be used to form the blend. For example, the following blend samples (Blends A-D) were created and tested.

TABLE 3

Composition of Blend A

| Material | MgO | $Al_2O_3$ | $SiO_2$ | $SO_3$ | $K_2O$ | CaO | $Fe_2O_3$ | Total | Sum (Al/Si/Fe) | % in Mix | % Sum |
|---|---|---|---|---|---|---|---|---|---|---|---|
| Landfill | 2.05 | 14.51 | 48.24 | 10.77 | 0.87 | 14.16 | 7.47 | 98.07 | 70.22 | 42.0 | 29.5 |
| Micrasil | 0.5 | 13.7 | 71 | 0.6 | 1.2 | 0.7 | 1 | 88.7 | 85.7 | 58.0 | 49.7 |
| Final Chem | 1.15 | 14.04 | 61.44 | 4.87 | 1.06 | 6.35 | 3.72 | 92.6 | 79.2 | 100.0 | 79.2 |

Blend A was created by mixing the quantities of "Micrasil" and "Landfill" illustrated in Table 3, each having the chemical composition shown. Blend A was subjected to ASTM C989 Slag Testing (with 50% control cement and 50% slag, 172 mL of water, and cube flow of 106) and exhibited the results shown below in Table 4.

TABLE 4

Compressive Strength Testing of Blend A
Compressive Strength (PSI)

| 1 Day | 7 Days | 28 Days | 56 Days |
|---|---|---|---|
| 2240 | 6080 | 7620 | 10380 |

TABLE 5

Composition of Blend B

| Material | MgO | $Al_2O_3$ | $SiO_2$ | $SO_3$ | $K_2O$ | CaO | $Fe_2O_3$ | Total | Sum (Al/Si/Fe) | % in Mix | % Sum |
|---|---|---|---|---|---|---|---|---|---|---|---|
| Landfill | 2.05 | 14.51 | 48.24 | 10.77 | 0.87 | 14.16 | 7.47 | 98.07 | 70.22 | 42.0 | 29.5 |
| F Ash | 2.32 | 16.31 | 59.28 | 0.62 | 1.28 | 7.04 | 9.26 | 96.11 | 84.85 | 58.0 | 49.2 |
| Final Chem | 2.21 | 15.55 | 54.64 | 4.88 | 1.11 | 10.03 | 8.51 | 96.9 | 78.7 | 100.0 | 78.7 |

Blend B was created by mixing the quantities of "F Ash" and "Landfill" shown in Table 5, each having the chemical composition shown. Blend B was subjected to ASTM C989 Slag Testing (with 50% control cement and 50% slag, 178 mL of water, and cube flow of 107) and exhibited the results shown below in Table 6.

TABLE 6

Compressive Strength Testing of Blend B
Compressive Strength (PSI)

| 1 Day | 3 Days | 7 Days | 14 Days | 28 Days | 56 Days |
|---|---|---|---|---|---|
| 1810 | 3880 | 5260 | 5570 | 6610 | 8640 |

TABLE 7

Composition of Blend C

| Material | MgO | $Al_2O_3$ | $SiO_2$ | $SO_3$ | $K_2O$ | CaO | $Fe_2O_3$ | Total | Sum (Al/Si/Fe) | % in Mix | % Sum |
|---|---|---|---|---|---|---|---|---|---|---|---|
| Landfill | 2.05 | 14.51 | 48.24 | 10.77 | 0.87 | 14.16 | 7.47 | 98.07 | 70.22 | 40 | 28.1 |
| F Ash | 2.32 | 16.31 | 59.28 | 0.62 | 1.28 | 7.04 | 9.26 | 96.11 | 84.85 | 40 | 33.9 |
| Class C Ash | 5.92 | 16.55 | 35.49 | 2.06 | 0.49 | 27.13 | 6.17 | 93.81 | 58.21 | 20 | 11.6 |
| Final Chem | 2.93 | 15.64 | 50.11 | 4.97 | 0.96 | 13.91 | 7.93 | 96.4 | 73.7 | 100.0 | 73.7 |

Blend C was created by mixing the quantities of "F Ash," "Class C Ash," and "Landfill" shown in Table 7, each having the chemical composition shown. Blend C was subjected to ASTM C989 Slag Testing (with 50% control cement and 50% slag, 178 mL of water, and cube flow of 1119901) and exhibited the results shown below in Table 8.

TABLE 8

Compressive Strength Testing of Blend C
Compressive Strength (PSI)

| 1 Day | 3 Days | 7 Days | 14 Days | 28 Days | 56 Days |
|---|---|---|---|---|---|
| 1810 | 3920 | 4405 | 5405 | 6265 | 8007 |

TABLE 9

Composition of Blend D

| Material | MgO | $Al_2O_3$ | $SiO_2$ | $SO_3$ | $K_2O$ | CaO | $Fe_2O_3$ | Total | Sum (Al/Si/Fe) | % in Mix | % Sum |
|---|---|---|---|---|---|---|---|---|---|---|---|
| Landfill | 2.05 | 14.51 | 48.24 | 10.77 | 0.87 | 14.16 | 7.47 | 98.07 | 70.22 | 40 | 28.1 |
| Micrasil | 0.5 | 13.7 | 71 | 0.6 | 1.2 | 0.7 | 1 | 88.7 | 85.7 | 40 | 34.3 |
| Class C Ash | 5.92 | 16.55 | 35.49 | 2.06 | 0.49 | 27.13 | 6.17 | 93.81 | 58.21 | 20 | 11.6 |
| Final Chem | 2.93 | 15.64 | 50.11 | 4.97 | 0.96 | 13.91 | 7.93 | 96.4 | 73.7 | 100.0 | 74.0 |

Blend D was created by mixing the quantities of "Class C Ash," "Micrasil," and "Landfill" illustrated in Table 9, each having the chemical composition shown. Blend D was subjected to ASTM C989 Slag Testing (with 50% control cement and 50% slag, 195 mL of water, and cube flow of 108) and exhibited the results shown below in Table 10.

TABLE 10

Compressive Strength Testing of Blend D
Compressive Strength (PSI)

| 1 Day | 7 Days | 28 Days | 56 Days |
|---|---|---|---|
| 870 | 2980 | 6620 | 8540 |

Each of Blends A-D produced a Grade 100 to 120 reactive slag material, as tested using ASTM C 989 testing protocol.

Upon consideration of the subject disclosure, one skilled in the art will appreciate that using about 50 wt % of the roller mill-processed/landfill material, which has no organics in it but may have up to 15-20 wt % sulfur products, the feed rate can be adjusted to mix these materials to obtain a product that has around 5 wt % sulfur oxide (e.g., usually sulfite). It was discovered that the sulfite helped the reactivity of the blended pozzolans reactivity.

In some embodiments, the contents of the blend can be monitored, for example, by x-ray diffraction (XRD) analysis. Example XRD analysis systems that may be used include those produced by Bruker, Panalytical, and Fisons. Monitoring the blend's components (specifically its non-carbon components) can allow for adjustments to be made. For example, in some embodiments, monitoring of the components may prompt the addition of other ingredients from silos that have been ground-down already. In these and other embodiments an electrical tie-in to a controller may be used, as needed, to make a pozzolan that meets all the desired chemical requirements for high-performance concrete.

In a particular example embodiment, a reclamation site may be configured as follows:

A first silo containing Class C fly ash from any source;

A second silo containing landfill material crushed with roll crusher, then dried (ignited coal) with Holo-Flite® auger;

A third silo containing class C bottom ash (e.g., from limestone—obtained from a power station—or other source) crushed to 50-300 mesh with roll crusher;

A fourth silo containing raw class F fly ash, MicraSil® high-activity natural pozzolan, or other High Sum material (i.e., material high in silica, iron, or alumina content, for example, Class F fly ash or microsilica), dried and crushed to 50-200 mesh; and A fifth silo containing gypsum (as a fine powder, as purchased).

In an example embodiment, the materials from the reclamation site may be batched and weighted into a mill for processing. In particular, the materials may be batched by weight based on their chemistry and then interground together in reactors. In some embodiments, variable flow feeders can be used at the bottom of each silo to control each mineral feed instantaneously based on the processed/landfill material chemistry. The resulting blend may be a superior pozzolan. An exemplary blend was created containing the compounds identified below in Table 11.

As shown in Tables 12 and 13, the cement containing the exemplary blend of reclaimed CCB material exhibited greater compressive strength than the control cement. The testing data suggest that the CCB materials reclaimed according to the presently disclosed methods may improve cement properties when used as an additive.

As will be appreciated, the blends produced according to the disclosed methods can be incorporated into cement using any standard technique. For example, the blends may be incorporated into ready-mix or other types of cement. In these and other embodiments, the disclosed blends may be used with cement to make concrete, as typically manufactured by ready-mix companies, architectural concrete companies (e.g., Oldcastle), and pre-cast companies (e.g., Forterra).

The performance of the finished pozzolan (i.e., blend formed from reclaimed CCBs) may, in some embodiments, be capable of attaining much higher strengths than just the raw fly ash (if it could be separated) or any ground-down bottom ash ever could accomplish by itself, while also

TABLE 11

Compounds of Exemplary Blend

| Material | MgO | $Al_2O_3$ | $SiO_2$ | $SO_3$ | $K_2O$ | CaO | $Fe_2O_3$ | Total | Sum (Al/Si/Fe) | % in Mix | % Sum |
|---|---|---|---|---|---|---|---|---|---|---|---|
| Landfill | 2.05 | 14.51 | 48.24 | 10.77 | 0.87 | 14.16 | 7.47 | 98.07 | 70.22 | 34.0 | 23.9 |
| F Ash | 2.32 | 16.31 | 59.28 | 0.62 | 1.28 | 7.04 | 9.26 | 96.11 | 84.85 | 32.0 | 27.2 |
| C Bottom Ash | 3.61 | 24.72 | 31.22 | 1.11 | 0.31 | 16.49 | 5.73 | 83.19 | 61.67 | 8.0 | 4.9 |
| C Fly Ash | 5.92 | 16.55 | 35.49 | 2.06 | 0.49 | 27.13 | 6.17 | 93.81 | 58.21 | 25.0 | 14.6 |
| Micrasil/Perlite Ore | 0.5 | 13.7 | 71 | 0.6 | 1.2 | 0.7 | 1 | 88.7 | 85.7 | 0.0 | 0.0 |
| Gypsum/FDG Sluge | 0.2 | 0.62 | 0.88 | 44.6 | 0.2 | 31.5 | 0.2 | 78.2 | 1.7 | 1.0 | 0.0 |
| Final Chem | 3.21 | 16.27 | 46.75 | 4.91 | 0.85 | 51.51 | 7.51 | 95.0 | 70.5 | 100.0 | |

The exemplary blend shown in Table 11 was incorporated into concrete and tested. Comparative data for cement containing the exemplary blend and control cement are shown below in Tables 11 and 12.

The Exemplary Cement and Control Cement were subjected to ASTM C989 Slag Testing (with 50% control cement and 50% slag). The Exemplary (landfill) Blend was tested with 178 mL of water and cube flow of 107 and the Control Cement was tested with 232 mL of water and cube flow of 108. The compressive strength testing results of the Exemplary Blend and the Control Cement are shown in Tables 12 and 13.

TABLE 12

Testing Data for Control Cement

| | 1 Day | 7 Days | 28 Days | 56 Days |
|---|---|---|---|---|
| Compressive Strength (PSI) | 2250 | 3590 | 4740 | 5460 |

TABLE 13

Testing Data for Concrete with Exemplary Blend

| | 1 Day | 3 Days | 7 Days | 14 Days | 28 Days | 56 Days |
|---|---|---|---|---|---|---|
| Compressive Strength (PSI) | 1809 | 3877 | 5255 | 5567 | 6612 | 8637 |
| Strength Activity Index % of Control | 80% | | 146% | | 139% | 158% | balancing the sulfur content to allow the material to meet ASTM requirements.

Without wishing to be bound by theory, it is believed that once crushed/processed in the proprietary mill, any pyrites present in the CCBs are not yet fully oxidized, therefore, there are no issues with pyrite staining in the concrete. If desired, further processing according to known techniques may be used to increase the reactivity of the pozzolan blend.

The presently disclosed methods may offer numerous advantages over previous approaches. For example, any organics (e.g., wood, plastics, etc.) present in the landfill may be combusted in the drying process. Thus, the reclaimed landfill material can be "sterilized" from components that would keep the finished pozzolan from being used to make a high-performance concrete.

Additionally, the disclosed methods may also allow for the removal of all contaminants through a novel drying/coal burnout application and a subsequent novel addition of certain mineral additives based on the landfill/ash pond chemistry driving their addition rate. This can produce an environmentally friendly, high-performing pozzolanic material that allows all landfills and/or ash ponds in the U.S. (and elsewhere) to be processed economically, as well as provide an environmentally safe end-use (e.g., concrete) for these materials.

The present disclosure importantly provides reclamation techniques to utilize coal combustion byproducts (CCBs), which remain after massive amounts of coal were burned to make the electricity required to move the U.S. to become a world leader in energy production. Specifically, the present disclosure provides safe and economical ways to reverse a huge environmental issue derived from the residue of burning the different coals (sub bituminous, bituminous, and/or lignite) that all produced large volumes of waste ash byproducts (fly ash, bottom ash) and gas cleaning residues (scrubber wastes) as well as other wastes that ended up in landfills. The materials reclaimed by the disclosed techniques can be mixed in with ash byproducts to produce a superior pozzolan for cementitious materials.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A method of reclaiming additives for cement from a mixed waste landfill, the method comprising:
    obtaining mixed waste from a landfill, wherein the mixed waste comprises coal combustion byproducts (CCBs) from a coal-fired power plant;
    crushing the mixed waste to form crushed mixed waste;
    drying the crushed mixed waste to form dried crushed mixed waste; and
    combining the dried crushed mixed waste with other compounds to form a blend.

2. The method of claim 1, wherein the landfill is a pond or a dry landfill.

3. The method of claim 1, wherein the mixed waste contains at least one of fly ash, bottom ash, scrubber residue, pyrites, and coal.

4. The method of claim 1, wherein the mixed waste has a moisture content between 10% and 20%.

5. The method of claim 1, wherein the mixed waste is crushed to a size of 50-325 mesh.

6. The method of claim 1, wherein the crushed mixed waste is dried at a temperature of at least 350° F.

7. The method of claim 1, wherein the crushed mixed waste is dried until a moisture content of less than 2% is achieved.

8. The method of claim 1 further comprising storing the dried crushed mixed waste in a silo.

9. The method of claim 1, wherein the dried crushed mixed waste is combined with class C fly ash, a high-activity natural pozzolan, class F fly ash, and dried class C bottom ash ground to a mean particle size of 15-20 μm to form the blend.

10. The method of claim 1 further comprising adding calcium sulfate to form the blend.

11. The method of claim 1 further comprising incorporating the blend into a cement material.

12. The method of claim 1, wherein the blend includes at least one of calcium sulfate and calcium sulfite.

13. A method of reclaiming additives for cement from a mixed waste landfill, the method comprising:
    obtaining mixed waste from a landfill;
    crushing the mixed waste to form crushed mixed waste;
    drying the crushed mixed waste to form dried crushed mixed waste;
    exposing the crushed mixed waste to a desorber to capture compounds that are volatized during drying; and
    combining the dried crushed mixed waste with other compounds to form a blend.

14. The method of claim 13 further comprising incorporating the blend into a cement material.

15. The method of claim 13, wherein the blend includes at least one of calcium sulfate and calcium sulfite.

* * * * *